(No Model.) 5 Sheets—Sheet 1.

T. R. McKNIGHT.
ROAD SCRAPER.

No. 588,753. Patented Aug. 24, 1897.

Witnesses
Wm. J. Henning
Nellie McKibben

Inventor
Thomas R. McKnight
by Bond Adams Pickard & Jackson Att'ys.

(No Model.) 5 Sheets—Sheet 3.

T. R. McKNIGHT.
ROAD SCRAPER.

No. 588,753. Patented Aug. 24, 1897.

(No Model.)  5 Sheets—Sheet 4.
T. R. McKNIGHT.
ROAD SCRAPER.
No. 588,753. Patented Aug. 24, 1897.
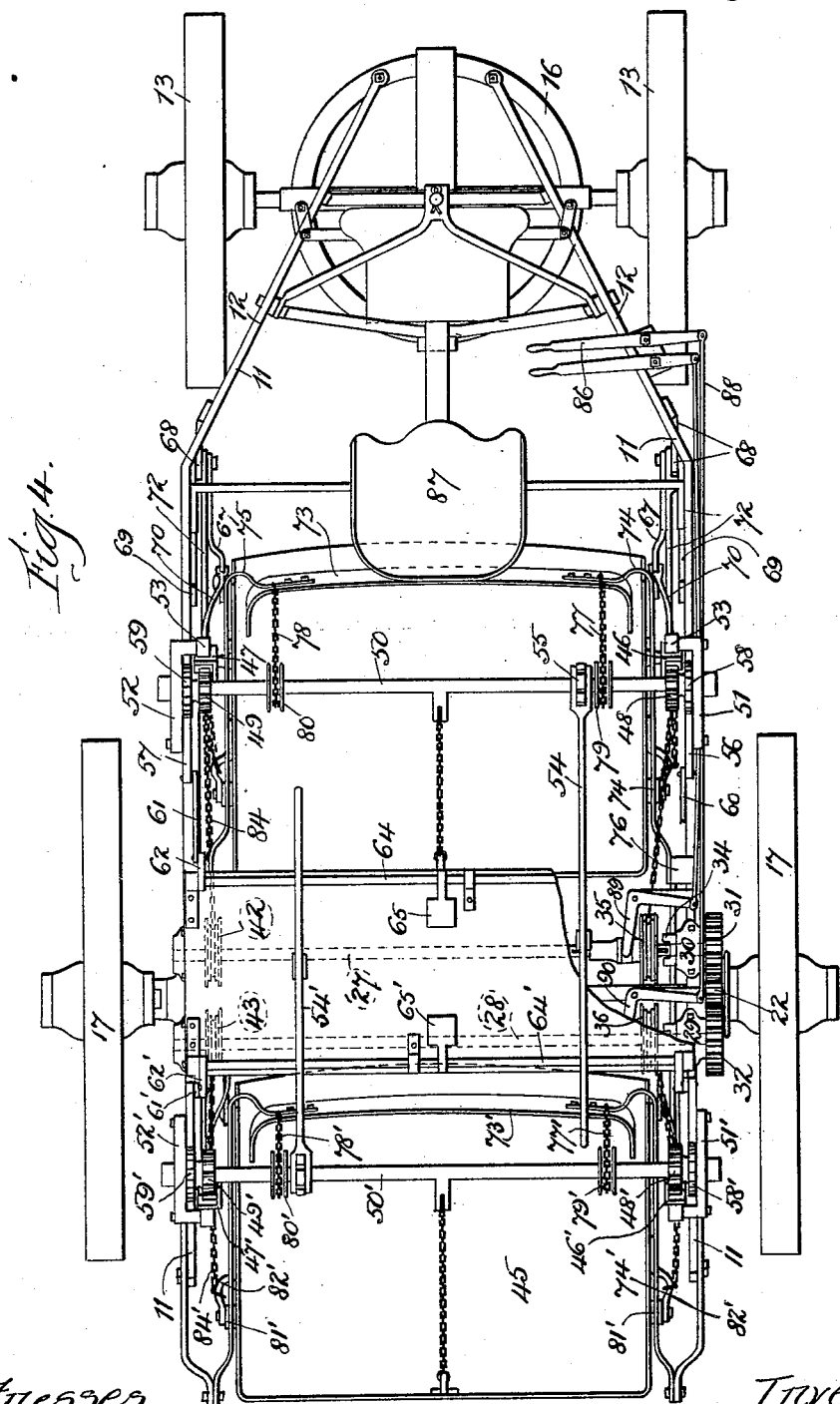
Witnesses
Wm. J. Henning
Nellie McKibben
Inventor
Thomas R. McKnight
by Bond, Adams, Pickard and Jackson
Attys.

(No Model.) 5 Sheets—Sheet 5.
T. R. McKNIGHT.
ROAD SCRAPER.
No. 588,753. Patented Aug. 24, 1897.
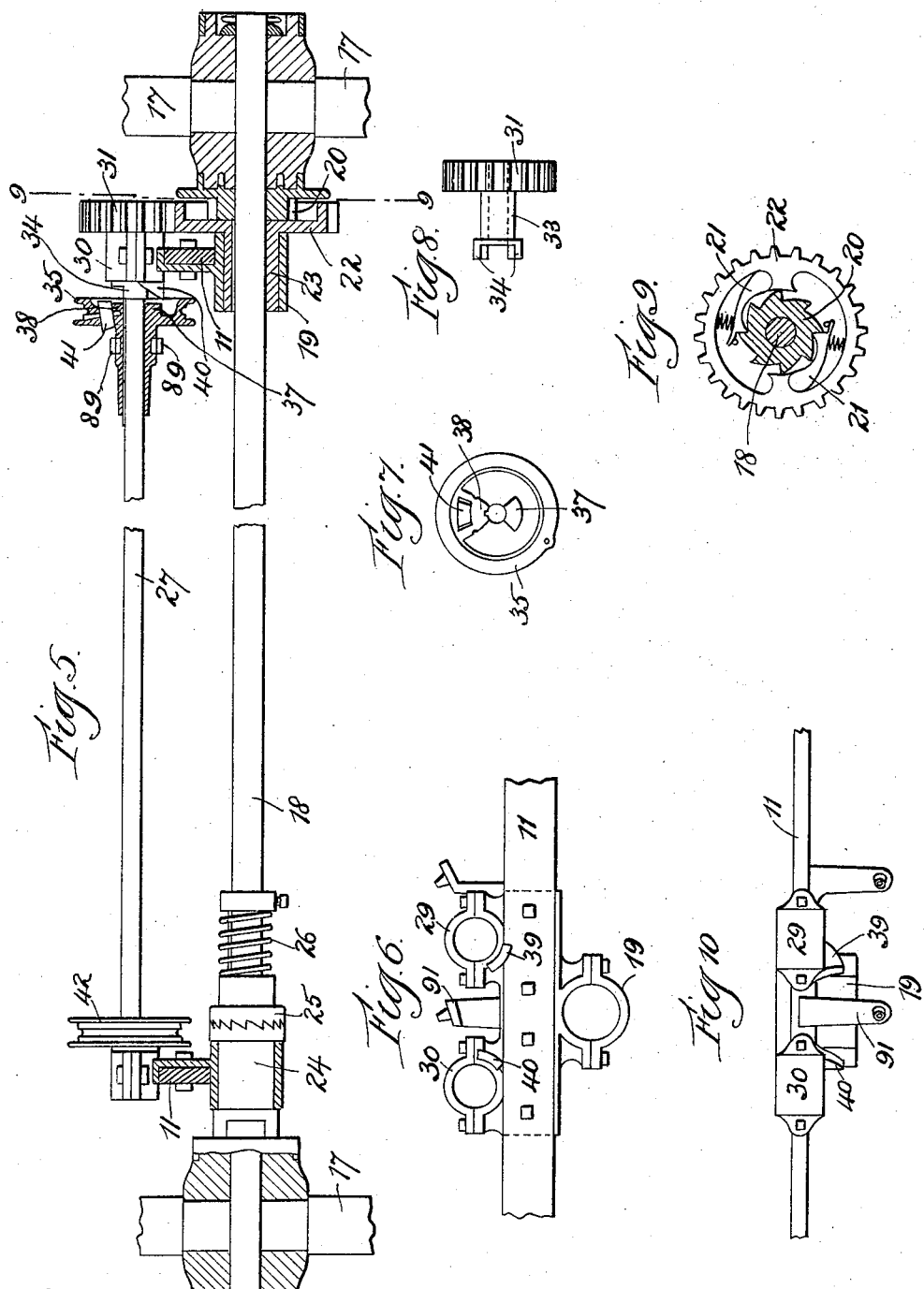

UNITED STATES PATENT OFFICE.

THOMAS RUEL McKNIGHT, OF AURORA, ILLINOIS, ASSIGNOR TO THE WESTERN WHEELED SCRAPER COMPANY, OF SAME PLACE.

ROAD-SCRAPER.

SPECIFICATION forming part of Letters Patent No. 588,753, dated August 24, 1897.

Application filed January 10, 1895. Serial No. 534,488. (No model.)

*To all whom it may concern:*

Be it known that I, THOMAS RUEL MC-KNIGHT, a citizen of the United States, residing at Aurora, in the county of Kane and State of Illinois, have invented certain new and useful Improvements in Road-Scrapers, of which the following is a specification, reference being had to the accompanying drawings, in which—

Figure 1:
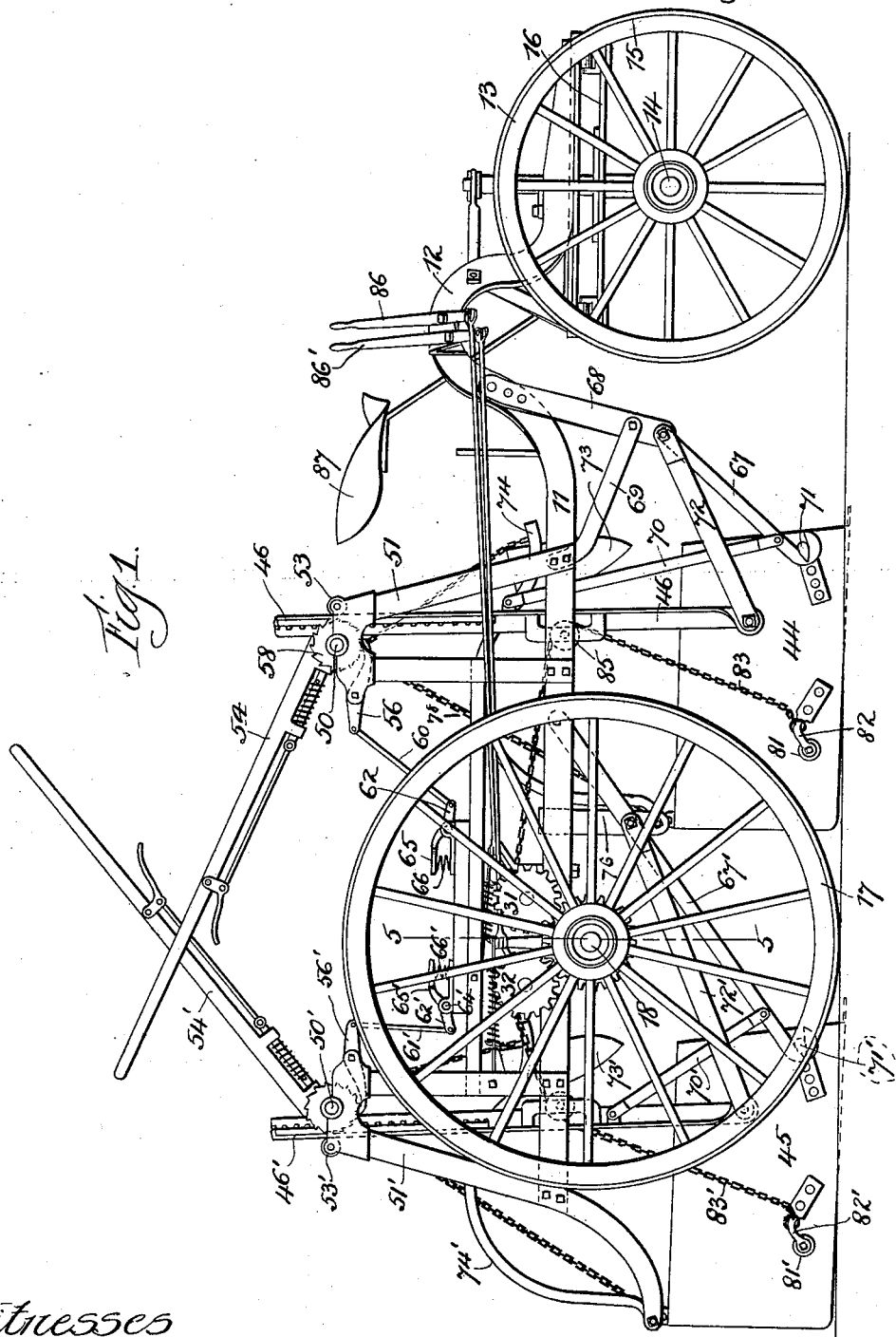
Figure 2:
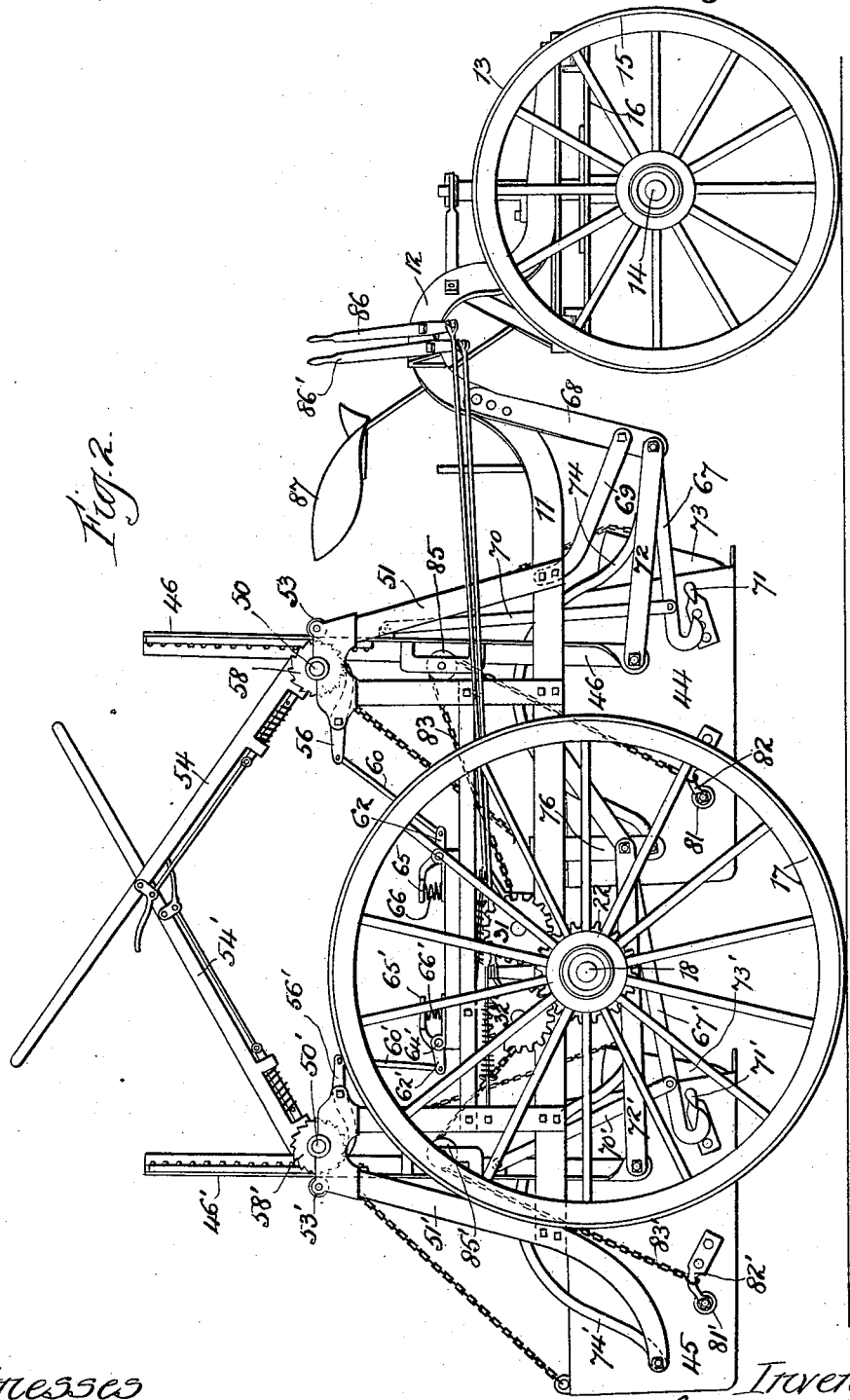
Figure 3:
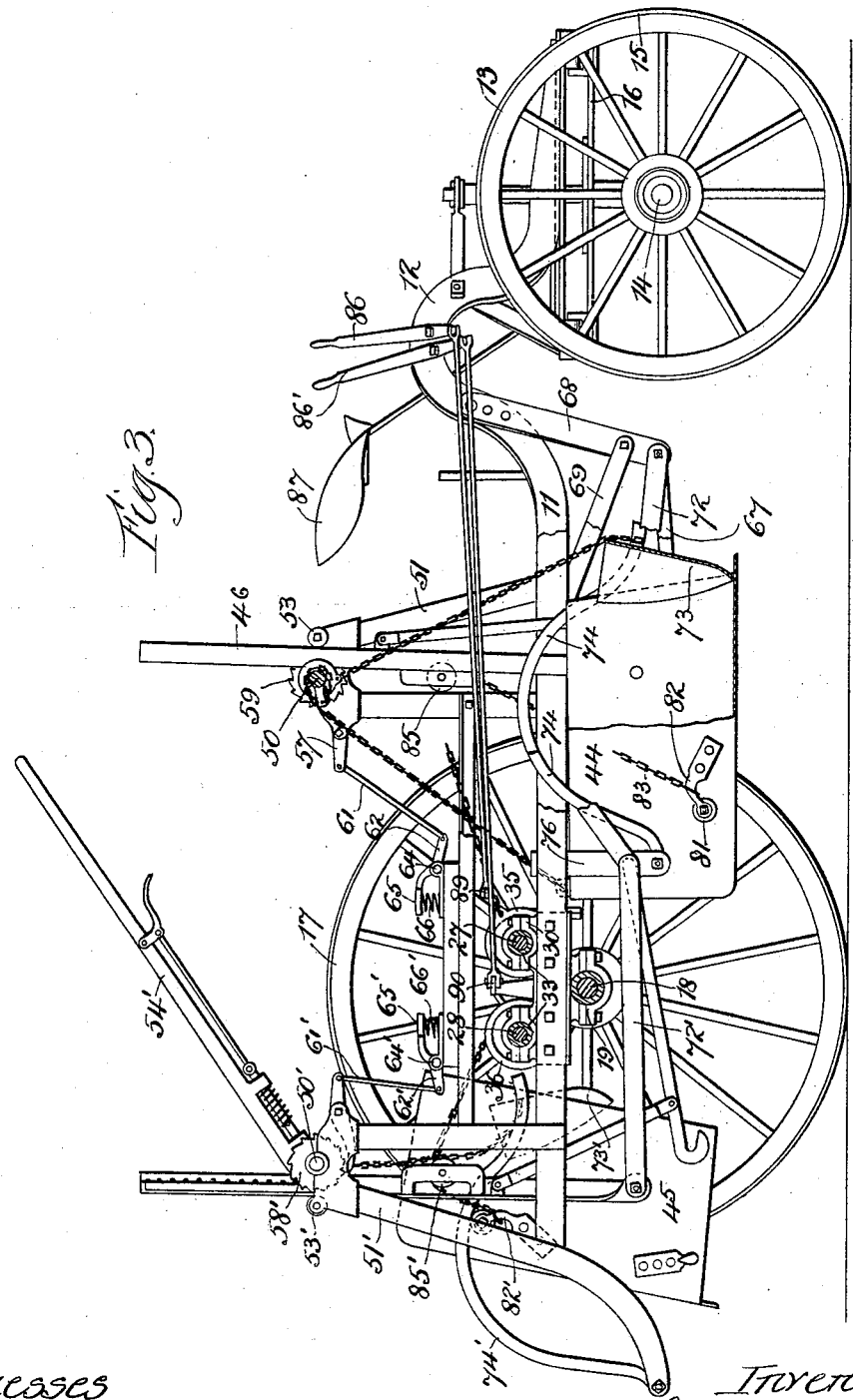

Figure 1 is a side elevation showing the scraper ready for loading. Fig. 2 is a similar view showing the position of the scraper-pans when transporting the load. Fig. 3 is a partial longitudinal vertical section showing one of the pans as in transporting the load and the other as in the operation of discharging the load. Fig. 4 is a plan view, part of the platform being broken away. Fig. 5 is a partial vertical cross-section on line 5 5 of Fig. 1, showing the mechanism for dumping the pans, part of such mechanism being shown in section. Fig. 6 is an enlarged detail, being a side elevation of the bearings for the operating-shafts. Fig. 7 is a face view of one of the members of the clutch by which the dumping of the pans is effected. Fig. 8 is a side view of the other member of the clutch. Fig. 9 is a section on line 9 9 of Fig. 5, showing the ratchet mechanism carried by the rear axle of the scraper. Fig. 10 is a plan view of the parts shown in Fig. 6.

My invention relates to road-scrapers, and particularly to that class in which one or more pans are mounted upon a carriage and are so arranged as to be capable of being operated to take up the dirt and transport it to any desired point where it may be dumped.

My present invention consists in certain improvements upon the scrapers heretofore devised, and relates particularly to improved mechanism for manipulating the scraper-pans so that they may be easily lowered for purposes of loading and raised for transporting the load; also, to an improved mode of construction whereby the scraper-pans may be dumped by the forward movement of the machine.

Another improvement relates to the end gates designed for closing the open ends of the pans when the load is being transported.

My invention also comprises certain other improvements which will be specifically hereinafter set forth.

That which I regard as new will be pointed out in the claims.

In the drawings, 11 indicates the frame of the carriage, which is of suitable shape to support the various parts of the machine. The frame 11 has at its forward end the usual gooseneck-reach 12 to permit the front wheels 13 to turn sufficiently. 14 indicates the front axle. 15 indicates the front wheels. 16 indicates the fifth-wheel. All of these parts may be of any approved construction.

17 indicates the rear wheels, which are mounted upon an axle 18.

The axle 18 is journaled in bearings 19, secured to the rear portion of the frame 11, as shown in Figs. 3 and 6. One of the rear wheels 17 carries on the inner end of its hub a ratchet-wheel 20, which is engaged by pawls 21, pivoted in a gear 22, which is mounted upon and keyed to the axle 18, as best shown in Fig. 5. The gear 22 is provided with a sleeve 23, which is journaled in the bearing 19. The arrangement is such that when the rear wheels rotate forward the gear 22 will also be rotated; but it will not be rotated when the wheels 17 are turned backward. Near the other rear wheel 17 is a clutch-section 24, loosely mounted upon the axle 18, which clutch-section engages a clutch-section 25, which is keyed to said axle and held in contact with the clutch-section 24 by a spring 26, as shown in Fig. 5. By this arrangement both the rear wheels may be turned backward without rotating the axle 18, but by their forward rotation the axle 18 will be rotated.

Arranged parallel to the axle 18 and slightly above the same are two shafts 27 28, as indicated by dotted lines in Fig. 4. The shafts 27 28 are journaled, respectively, in bearings 29 30, secured to the frame 11, as best shown in Fig. 6, a pair of said brackets being arranged at each side of the machine.

31 32 indicate gears mounted upon the shafts 27 28, respectively, and meshing with the gear 22, as shown in Fig. 1. Each of said gears is provided with a sleeve 33, which sleeves are journaled in the bearings 29 30, respectively, and on the inner ends of said sleeves are clutch-sections 34, as shown in Fig. 8. Opposite the clutch-sections 34 and mounted upon the shafts 27 28, respectively, are pulleys 35 36, as shown in Fig. 4, the outer faces of said pulleys being adapted to coact with the clutch-sections 34 when said pulleys are moved upon the shafts 27 28 to bring them into engagement with said clutch-sections. For this purpose the pulleys 35 36 are mounted upon feathers upon their respective shafts. For this purpose the outer face of each of the pulleys 35 36 is countersunk, leaving projecting lugs 37 38 on each face, so that the clutch-sections 34 may interlock with said pulleys, and consequently when the gears 31 32 are rotated the pulleys 35 36 will also be rotated, thereby rotating the shafts 27 28. The pulleys 35 36 are automatically thrown out of engagement with the clutch-sections 34 by means of cam-lugs 39 40, projecting inwardly from the bearings 29 30, respectively, as shown in Fig. 6. Each of the pulleys 35 36 carries a roller 41, as shown in Figs. 5 and 7, and the arrangement is such that when the pulleys 35 36 are rotated about three-quarters of a complete rotation the rollers 41 will be engaged by the cams 39 40 and the pulleys 35 36 be thereby pushed inward out of engagement with the clutch-sections 34.

42 43 indicate pulleys, which are mounted upon the shafts 27 28, respectively, at the side of the machine opposite that at which the pulleys 35 36 are located. The pulleys 42 43 are fixedly mounted upon their respective shafts.

The pulleys 35 36 42 43 are for the purpose of dumping the two bowls or pans 44 45 of the scraper. The construction by which this is accomplished will be hereinafter set forth.

It will be understood that the two sets of apparatus for dumping the pans are used only when two pans are used, one of such sets being provided for each pan, and if more than two pans were used the dumping apparatus would be changed accordingly.

The pan 44 is pivoted upon the ends of rack-bars 46 47, which bars mesh with pinions 48 49, mounted upon the ends of a shaft 50, journaled in suitable bearings carried by frames 51 52, rising from the frame of the machine, as shown in Figs. 1 and 4. As shown in Fig. 4, the rack-bars 46 47 are angular in cross-section and are held in engagement with their respective pinions by rollers 53. The shaft 50 is rotated for the purpose of raising the pan by means of a ratchet-lever 54, which carries a pawl engaging a ratchet-wheel 55, mounted upon said shaft. Pawls 56 57, pivoted to the supports 51 52, respectively, and engaging with ratchet-wheels 58 59, serve to prevent reverse rotation of the shaft 50. By this construction the pan 44 may be raised to any desired height by operating the lever 54. For the purpose of lowering the pan 44 the pawls 56 57 are connected by links 60 61 to the arms 62 63 of a shaft 64, pivoted upon the frame 11, and provided with a foot-lever 65, by means of which it may be rocked. A spring 66 serves to hold the foot-lever 65 normally in its upper position, and thereby holds the pawls 56 57 in engagement with their respective ratchet-wheels. As soon as the pawls 56 57 release said ratchet-wheels and the pawl carried by the lever 54 is also moved out of engagement with the ratchet-wheel 55 the pan 44 will descend by its own weight.

67 indicates hooks, supported by bars 68, depending from the frame 11.

69 indicates braces for the bars 68.

70 indicates bars which connect the hooks 67 with the rack-bars 46 47, so that when the pan 44 is raised the hooks 67 will be swung out of engagement with the hooks 71, carried by the pan, as shown in Fig. 1.

72 indicates braces for the lower ends of the rack-bars 46 47, which braces are connected to the bars 68, as shown in Fig. 1.

73 indicates an end gate, which is carried by bars 74 75, pivoted to supporting-bars 76, depending from opposite sides of the frame 11, opposite the rear portion of the pan 44, as shown in Fig. 2. The bars 74 75 are somewhat semicircular in shape, as shown in the drawings, the object of which will be hereinafter set forth.

77 78 indicate chains, which are connected to the ends of the end gate 73 and are wound around pulleys 79 80, mounted upon the shaft 50, the arrangement being such that when the shaft 50 is rotated to elevate the pan the end gate 73 will be lowered over the open end of the pan, as shown in Fig. 2, and vice versa.

For the purpose of moving the end gate 73 out of the way when dumping the scraper rollers 81 are provided at each side of the pan, which rollers are secured to suitable supports 82, as shown in Fig. 1. The rollers 81 are adapted, when the pan 44 is tilted, to move into engagement with the bars 74 75, which carry the end gate 73, and the shape of the bars 74 75 is such that when the pan is so tilted it will be raised sufficiently to move the end gate 73 out of the way. When the pan is lowered again to its loading position, the end gate will be held in its upper position by the chains 77 78.

For the purpose of dumping the pan 44 chains 83 84 are provided, which are connected to the opposite sides of the pan 44 by means of the arms 82 or some other suitable device, and after passing over pulleys 85, supported by the rack-bars 46 47, they are connected to the pulleys 42 43. By this arrangement when said pulleys are rotated to wind up the chains the rear of the pan 44 will be elevated and the load dumped. The dumping of the rear pan is illustrated in Fig. 3.

The dumping of the pan is placed in control of the operator by means of a lever 86, pivoted in the frame of the machine near the driver's seat 87, which lever is connected by a rod 88 to a bell-crank lever 89, which carries a fork 90, embracing the sleeve of the pulley 35, as shown in Fig. 5, so that by operating said lever the pulley 35 may be shifted laterally upon the shaft 27 to bring it into engagement with the clutch 34. In this way by moving the pulley 35 into engagement with said clutch by means of the hand-lever the pan will be dumped by the forward movement of the machine. The bell-crank 89 is mounted upon a suitable support 91, carried by the frame of the machine, as shown in Fig. 10.

After the pan has been dumped the cam 39 will engage the roller 41 and will thereby move the pulley 35 out of engagement with the clutch-section 34, which will permit the pan to return to its normal position.

The rear pan 45 is arranged similarly to the pan 44 and the mechanism for operating it is the same. The corresponding parts are therefore indicated by corresponding prime reference-numerals.

I do not limit myself to the specific details of construction described, as it will be understood that equivalent devices may be used for effecting the different operations, but the devices illustrated are those which secure the best results.

While in the construction shown the dumping apparatus is operated by the forward movement of the carriage, it is obvious that by reversing certain of the operating parts the scraper may be so arranged as to dump when the carriage is backed. This, however, is included in my invention.

That which I claim as my invention, and desire to secure by Letters Patent, is—

1. The combination with a carriage, a scraper-pan, and vertically-movable rack-bars 46 47, of braces 72, hooks 67 engaging said scraper-pan, and bars 70 connecting said hooks to said rack-bars, substantially as described.

2. In a scraper, the combination with a carriage-frame, and a scraper-pan supported therefrom, of an end gate pivotally connected to said frame, means for moving said end gate over the front of said pan when the pan is elevated, means for dumping the pan, and a device carried by said pan for moving the end gate out of the way when the pan is dumped, substantially as described.

3. In a scraper, the combination with a frame, and a scraper-pan supported thereby, of an end gate, arms connected to said end gate and pivotally supported by said frame near the rear end of the scraper-pan, and a device carried by said pan and adapted to engage said end-gate supports to move the end gate out of the way when the pan is dumped, substantially as described.

4. In a scraper, the combination with a frame, and a pan, of an end gate 73, bars 74 75 connected to said end-gate and pivoted to said frame near the rear end of the scraper-pan, a device carried by said pan adapted to engage said bars to move the end gate out of the way when the pan is dumped, and means for dumping the pan, substantially as described.

5. In a scraper, the combination with a frame, and a pan, of an end gate 73, bars 74 75 connected to said end gate and pivoted to said frame near the rear end of the scraper-pan, a device carried by said pan adapted to engage said bars to move the end gate out of the way when the pan is dumped, means for dumping said pan, a shaft 50, devices operated by the rotation of said shaft to raise and lower the scraper-pan, and a flexible device connected to the end gate and to said shaft whereby by the rotation of said shaft the end gate will be raised and lowered, substantially as described.

6. In a road-scraper, the combination with a carriage-frame, a scraper-pan, and vertically-movable rack-bars 46 47 for raising and lowering said pan, of an end gate pivotally supported from the carriage-frame, a shaft 50 geared with said vertically-movable rack-bars, ratchet-lever mechanism for rotating said shaft and flexible connection from said shaft to the end gate, substantially as described.

7. In a road-scraper, the combination with a carriage-frame, a scraper-pan supported therefrom, and means for raising and lowering said pan, of a shaft mounted on the frame and provided with pulleys 35, 42, the chains 83, 84 connected to said pulleys and to opposite sides of the rear portion of the scraper-pan, pulleys 85 carried by the pan-supports and over which said chains are passed, the bell-crank lever 89 having a fork engaged with the sleeve of the pulley 35, the lever 86, and the rod 88 connecting said levers 88 and 89, substantially as described.

8. In a road-scraper, the combination with a carriage-frame, a scraper-pan supported from said frame, and means for raising and lowering the said pan, of the axle 18 having on one end the clutches 24 and 25 and on the other end a gear 22 provided with pawls 21, a ratchet-wheel 20 carried on the inner end of one of the wheel-hubs and engaged with said pawls, the shaft 27 having pulleys 35, 42 thereon and provided on one end with a gear 31 meshing with the gear 22, the said gear 31 and pulley 35 being provided with coacting clutch sections or projections, a cam-lug, as 39, to throw the pulley 35 out of engagement with the clutch-sections of said gear 31, the chains 83, 84 connected to the pulleys 35, 42 and to opposite sides of the rear portion of the scraper-pan, the bell-crank lever 89 connected with the pulley 35, the lever 86 and the connecting-rod 88, substantially as described.

9. In a road-scraper, the combination with a carriage-frame, and a scraper-pan supported therefrom and provided with means for raising and lowering, of a shaft provided with pulleys 35 and 42, chains connecting said pulleys with the scraper-pan, whereby rotation of the shaft will wind the chains and dump the pan, a gear driven by the carriage and adapted to clutch with one of said pulleys, means for moving the said pulley and clutch into engagement with each other and a cam for disengaging the said clutch and pulley, substantially as described.

10. In a road-scraper, the combination with a carriage-frame, a scraper-pan supported from said frame, and means for raising and lowering the said pan, of the axle 18 having on one end the clutches 24 and 25 and on the other end a gear 22 provided with pawls 21, a ratchet-wheel 20 carried on the inner end of one of the wheel-hubs and engaged with said pawls, the shaft 27 having a pulley 35 thereon and provided on one end with a gear 31 meshing with the gear 22, the said gear 31 and pulley 35 being provided with coacting clutch sections or projections, a cam-lug, as 39, to throw the pulley 35 out of engagement with the clutch-sections of said gear 31, a flexible connection connecting the shaft 27 and the scraper-pan, the bell-crank lever 89 connected with the pulley 35, the lever 86 and the connecting-rod 88, substantially as described.

11. The combination with a carriage, and a scraper-pan, of a pulley 35, a clutch 34, means for driving said clutch by the movement of the carriage, means whereby said pulley and clutch may be moved into engagement with each other, and a cam 39 for moving said clutch and pulley out of engagement with each other after the pan has been dumped, substantially as described.

12. In a road-scraper, the combination with a carriage, and a plurality of scraper-pans supported by said carriage, of mechanism operated by the movement of the carriage for dumping the scraper-pans independently of each other, and means by which the operator can throw such dumping mechanism into operation when desired, substantially as described.

13. In a road-scraper, the combination with a wheeled carriage, and a plurality of scraper-pans supported from said carriage, of means for raising said pans, mechanism operated by the carriage axle or wheels for dumping the scraper-pans independently of each other, and means by which the operator can throw such dumping mechanism into operation to dump either of said scraper-pans, substantially as described.

14. In a road-scraper, the combination with a wheeled carriage, and a plurality of scraper-pans supported by said carriage, of pulleys having flexible connections with the pans, a gear driven by the carriage axle or wheels and adapted to clutch with one of the said pulleys, and means for causing the movement of said carriage to dump either of the scraper-pans, substantially as described.

THOMAS RUEL McKNIGHT.

Witnesses:
C. B. RUKGABER,
F. C. WORTHINGTON.